(No Model.)
G. H. CONDICT.
ELECTRIC RAILWAY.
No. 385,097. Patented June 26, 1888.
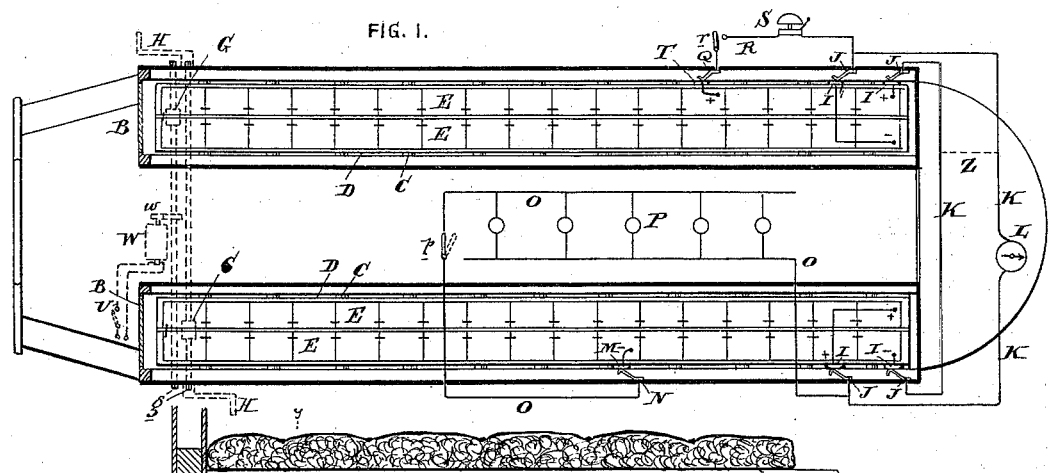
FIG. 1.
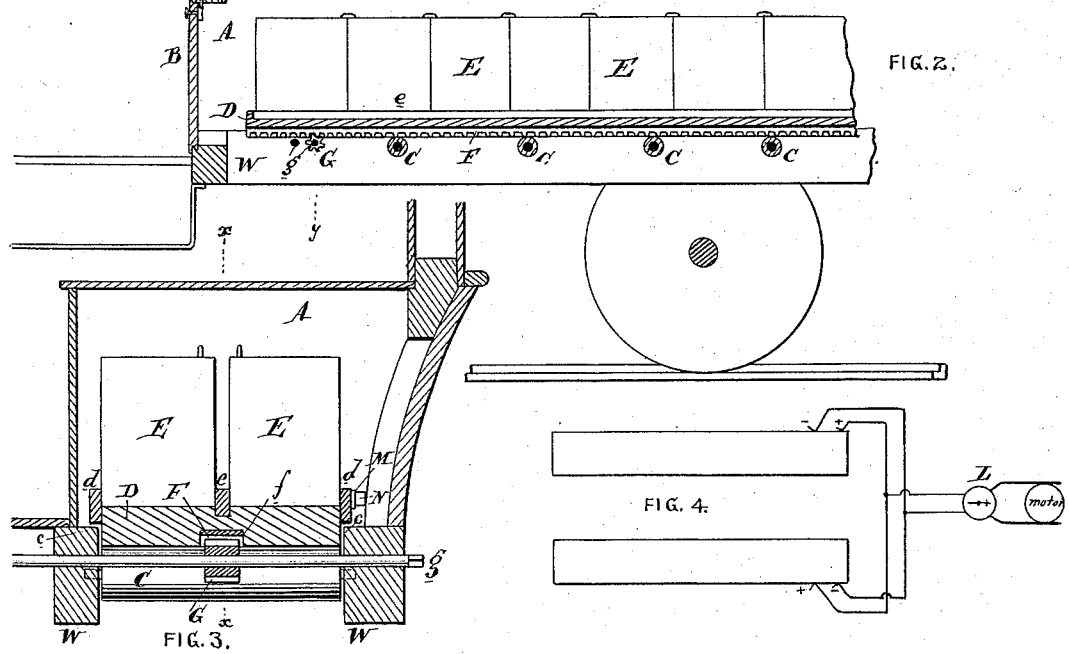
FIG. 2.
FIG. 3.
FIG. 4.
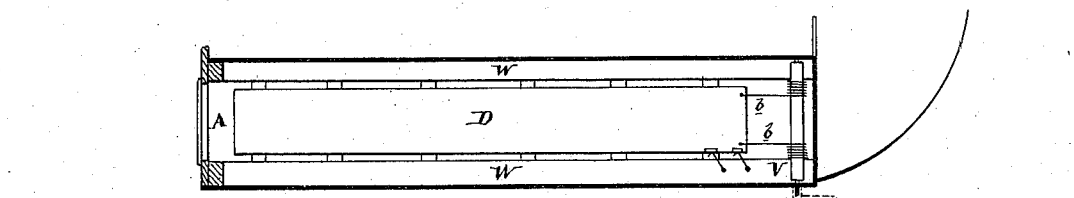
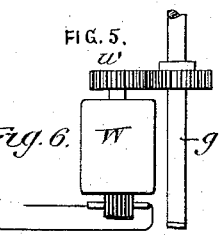
FIG. 5.
FIG. 6.
Attest.
Inventor.
G. Herbert Condict,

UNITED STATES PATENT OFFICE.

G. HERBERT CONDICT, OF PHILADELPHIA, PENNSYLVANIA, ASSIGNOR TO THE ELECTRIC CAR COMPANY OF AMERICA, OF PENNSYLVANIA.

ELECTRIC RAILWAY.

SPECIFICATION forming part of Letters Patent No. 385,097, dated June 26, 1888.

Application filed January 16, 1888. Serial No. 260,805. (No model.)

*To all whom it may concern:*

Be it known that I, G. HERBERT CONDICT, of the city and county of Philadelphia, and State of Pennsylvania, have invented an Improvement in Electric Railways, of which the following is a specification.

My invention has reference to electric railways; and it consists in certain improvements, which are fully set forth in the following specification and shown in the accompanying drawings, which form part thereof.

The object of my invention is to provide a suitable construction for inserting and removing storage or other batteries on cars or other vehicles, and also for providing suitable devices for automatically coupling such batteries with the motor, electric-lighting circuit, or signal-circuit, or either of them.

In carrying out my invention I provide the car or vehicle with suitable guides or supports, preferably under the seats and upon each side of the car. Upon such guides or supports I run slides or floors, upon which the secondary batteries are supported, and preferably having the cells coupled in series with each other. These slides or floors are run into and out of the car or vehicle by suitable mechanical power-applying devices, those shown in the preferred form being a rack and pinion; but it is evident that various devices might be resorted to for such purpose. The slide or floor is provided with contacts in circuit with the battery-cells, and the car-body is provided with similar stationary or practically fixed contacts in circuit with the motor or regulator therefor, and with the electric-lighting circuit, or with the signaling-circuit, so that at the operation of inserting the battery-supporting slides or floor the said batteries are automatically coupled in circuit with the translating devices. In the case of the lighting and signal circuits it is of course desirable to couple only a few of the cells into circuit. In the case of the motors it is desirable to have all of the cells in circuit, though of course it is not necessary that they should be.

I do not confine myself to any specific details, as they may be modified considerably without in the least departing from the spirit of the invention herein set out considered in its broadest scope.

In the drawings, Figure 1 is a sectional plan view of a car embodying my invention. Fig. 2 is a sectional elevation on line $x\ x$ of Fig. 3. Fig. 3 is a cross-section of same on line $y\ y$. Fig. 4 is a diagram showing a modified way of coupling up the batteries and motors. Fig. 5 is a diagram (plan) showing one form of device for mechanically putting the slides in place on the car, and Fig. 6 is a plan view showing the electric-motor connection with the slide-operating shaft.

A represents compartments under the seats of the car, and B are the doors at the end of the compartments, through which the battery-supporting slides D are removed or inserted.

C represents a series of rollers arranged in the lower parts of the compartments A, and preferably arranged between and slightly lower than the upper edges, $c$, of the sills or longitudinal frames W of the car.

By an examination of Fig. 3 of the drawings it will be evident that the rollers C guide the slides D against a downward movement, and the edges $c\ c$ of the sills prevent undesirable lateral movement to the slide. While I have found in practice that this form of guides is well suited to the purpose, it is evident that there are many other equivalent ways of accomplishing the same end. Again, it is clear that while the insertion of the slides from the end of the compartment has many practical advantages, it is to be understood that the slides may be inserted in the car in any other suitable manner or location. The slides D are grooved on their under surface longitudinally, as at $f$, and in such groove I place a rack, F, the lower part of which is arranged so as not to project below the under surface of the slide, that it may rest on and pass smoothly over the rollers C. The upper part of this slide may have longitudinal side guard-strips, $d\ d$, and also a central division-strip, $e$, between which the battery-cells E E are arranged and held against lateral displacement. The particular details of this slide are immaterial to the invention broadly considered, as are also its length and general shape. In the ordinary cars having seats on each side two of these slides for the batteries are employed, as shown in Fig. 1. Beneath these slides and meshing with the racks F thereof there are pinions G, preferably on separate shafts $g$, extending entirely across the car-body and exposed on each end, whereby cranks H may be temporarily attached on both ends to rotate said shaft and pinion to move the slides and their load of battery-cells into or out of the car. If desired, these pinions G may be rotated by an electric motor, W, geared at $w$ to the shaft of the pinion and having a circuit, U, extending to the side of the car, so that it may be connected up with a source of energy in the station. In place of moving the slides by the rack and pinion, a shaft or drum, V, and cords or chains $b$ may be used, as shown in Fig. 5, to pull the slide into place in the car.

On each of the battery-slides are contacts I I, which are connected with the two terminals of the battery, and these contacts when moved into place by inserting the slides make connection with the stationary or fixed contacts J J on the car-body and complete the motor-circuit through both batteries, coupling them in series, as indicated in Fig. 1, or in multiple, as shown in Fig. 4. The circuit K connects with the switch or regulator L for the motor or motors. If desired, only one battery may be used, in which case the motor-circuit should be closed, as indicated in dotted lines Z.

In the arrangement of coupling shown in Fig. 1 the cells of each battery are connected in series, and the two batteries are also coupled in series; but the cells may, if desired, be coupled in any other manner. A lighting-circuit, O, may be used on the car with lamps P to light the car, and this circuit receives current from only a portion of the cells of the full battery, and to put it in connection with said battery another pair of contacts, M N, similar to those I J, may be used. A circuit-breaking switch, $p$, is also used to put the lamps in or out of circuit. A signal-circuit, R, having an electric signal bell or gong, S, and circuit-breaker $r$, may be similarly coupled with a few cells, or even one cell, of the batteries by contacts Q T. It will thus be seen that all of the electric devices are automatically coupled in operative circuit by the simple act of putting the battery-slides into position on the car. I do not confine myself to any particular form of contacts nor as to their location.

Having now described my invention, what I claim as new, and desire to secure by Letters Patent, is—

1. A car having a guideway for a secondary battery slide or floor, in combination with a movable battery slide or floor upon which the batteries are arranged, and a mechanical power mechanism to move said battery slide or floor into or out of the car and upon its guideway.

2. A car having a guideway or support for a secondary battery slide or floor, in combination with a movable battery slide or floor upon which the batteries are arranged, provided with a rack, a pinion on the car to mesh with the rack of the slide, and suitable means to rotate said pinion.

3. A car having a guideway or support for a secondary battery slide or floor, in combination with a movable battery slide or floor upon which the batteries are arranged, provided with a rack, a pinion on the car to mesh with the rack of the slide, and a shaft carrying said pinion and extending to both sides of the car, whereby power may be applied at both ends.

4. A car having a guideway or support for a secondary battery slide or floor, in combination with a movable battery slide or floor upon which the batteries are arranged, provided with a rack, a pinion on the car to mesh with the rack of the slide, an electric motor to rotate said pinion, a motor-circuit, and a switch to control the motor.

5. In a car, the combination of guides upon which the battery floor or slide moves and rests, a battery floor or slide having a flat under-surface, and a rack set in flush with said under surface, and a pinion on the car to mesh with said rack and move the battery floor or slide over the guides.

6. In a car, the combination of cylindrical drums or rollers upon which the battery floor or slide moves and rests, a battery floor or slide having a flat under surface, and a rack set in flush with said under surface, and a pinion on the car to mesh with said rack and move the battery floor or slide over the guides.

7. The combination of a car having two parallel sills and a battery-support between them and below their upper edges, with a removable battery-supporting slide or floor fitting between said sills and upon said support and having projecting sides extending above said sills for holding the battery-cells in place, and battery-cells supported upon the slide or floor and between the raised sides.

8. The combination of a car having two parallel sills and a battery-slide support between them and below their upper edges, with a battery slide or floor having raised sides and center, in which the sides extend part way down on the slide or floor, forming offsets for the car-sills, and two parallel rows of removable battery-cells arranged upon said slide or floor and respectively between the said raised sides and center.

9. A car-body having a guideway or support for a battery slide or floor and provided with three stationary contacts and an electric motor on the car, in combination with a motor-circuit in connection with two of said contacts, a lighting-circuit in the car in connection with the remaining contact and one of the motor-contacts, a removable battery slide or floor having three contacts corresponding to the three stationary contacts and adapted to make electrical connection with them when put in place on the car-body, and a battery of a large number of cells supported on said slide or floor and having all of its cells connected to the motor-contacts and a portion only of its cells connected to the lighting-circuit contacts.

10. A car-body having a guideway or support for a battery slide or floor and provided with three stationary contacts and an electric motor on the car, in combination with a motor-circuit in connection with two of said contacts, a lighting-circuit on the car in connection with the remaining contact and one of the motor-contacts, a removable battery slide or floor having three contacts corresponding to the three stationary contacts and adapted to make electrical connection with them when put in place on the car-body, a battery of a large number of cells supported on said slide or floor and having all of its cells connected to the motor-contacts, a portion only of its cells connected to the lighting-circuit contacts, and an independent switch to make or break said electric-light circuit.

11. A car-body having a guideway or support for a battery slide or floor and provided with three stationary contacts and an electric motor on the car, in combination with a motor-circuit in connection with two of said contacts, an electric-signal circuit on the car in connection with the remaining contact and one of the motor-contacts, an electric signal in said circuit, a removable battery slide or floor having three contacts corresponding to the three stationary contacts and adapted to make electrical connection with them when put in place on the car-body, and a battery of a large number of cells supported on said slide or floor and having all of its cells connected to the motor-contacts and a small portion only of its cells connected to the signal-circuit contacts.

12. A car-body having a guideway or support for a battery slide or floor and provided with three stationary contacts and an electric motor on the car, in combination with a motor-circuit in connection with two of said contacts, an electric signal-circuit on the car in connection with the remaining contact and one of the motor-contacts, an electric signal in said circuit, a removable battery slide or floor having three contacts corresponding to the three stationary contacts and adapted to make electrical connection with them when put in place on the car-body, and a battery of a large number of cells supported on said slide or floor and having all of its cells connected to the motor-contacts, a small portion only of its cells connected to the signal-circuit contacts, and an independent switch to interrupt the signal-circuit without affecting the continuity of the motor-circuit.

13. A car-body, in combination with two sets of stationary contacts, an electric circuit connecting one of each of said sets of stationary contacts, a switch or regulator for controlling the motor, electric circuits from the other two stationary contacts connecting with the switch or regulator, two removable floors or battery-supports each having two contacts which make electrical connection with the stationary contacts when the floors or supports are put in place, and a battery supported on each floor and electrically connected with the contacts thereof, whereby the two batteries are connected in series with each other.

14. A car-body, in combination with two sets of stationary contacts, an electric circuit connecting one of each of said sets of stationary contacts, a switch or regulator for controlling the motor, electric circuits from the other two stationary contacts connecting with the switch or regulator, two removable floors or battery-supports each having two contacts which make electrical connection with the stationary contacts when the floors or supports are put in place, and a battery consisting of a number of cells permanently connected in series, supported on each floor, and electrically connected with the contacts thereof, whereby the cells of the two batteries are connected in series with each other and with the regulator.

15. The combination of the car-body, an electric-lighting circuit on said car-body, a removable slide or floor, a large number of battery-cells supported by said floor and connected in series, an electric motor-circuit on the car, contact devices controlled by the slide or floor for automatically coupling all of the cells in series with the motor-circuit, and additional contact devices, also controlled by the slide or floor, for coupling a small portion of said cells in circuit with the lighting-circuit upon placing said floor or slide into position on the car-body.

16. A battery slide or floor for a vehicle, consisting of the body part D, having the recess $f$ on the bottom, in which is set the rack F, and the raised sides $d$ at the top.

17. A battery slide or floor for a vehicle, consisting of the body part D, having the recess $f$ on the bottom, in which is set the rack F, and the raised sides $d$ at the top, and the central strip, $e$, to keep the two rows of cells separated.

In testimony of which invention I hereunto set my hand.

G. HERBERT CONDICT.

Witnesses:
R. M. HUNTER,
RICHD. S. CHILD, Jr.